No. 737,200. PATENTED AUG. 25, 1903.
F. BOWERS & T. REESE, Jr.
GATE OPERATING MECHANISM FOR HOPPERS.
APPLICATION FILED JAN. 17, 1903.
NO MODEL. 3 SHEETS—SHEET 1.
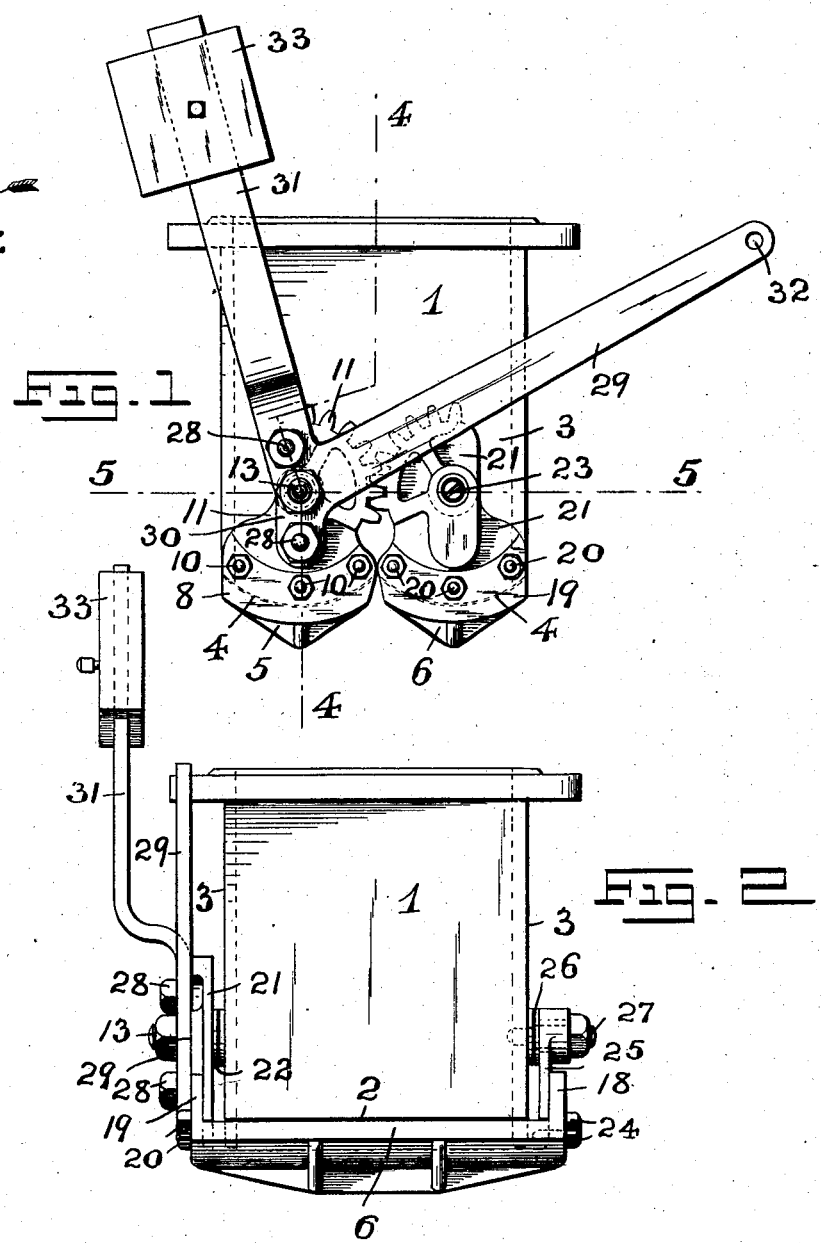
WITNESSES:
Geo. D. Richards
Geo. Douglass
INVENTORS:
Frank Bowers &
Thomas Reese Jr
BY
Fred C. Fraentzel.
ATTORNEY

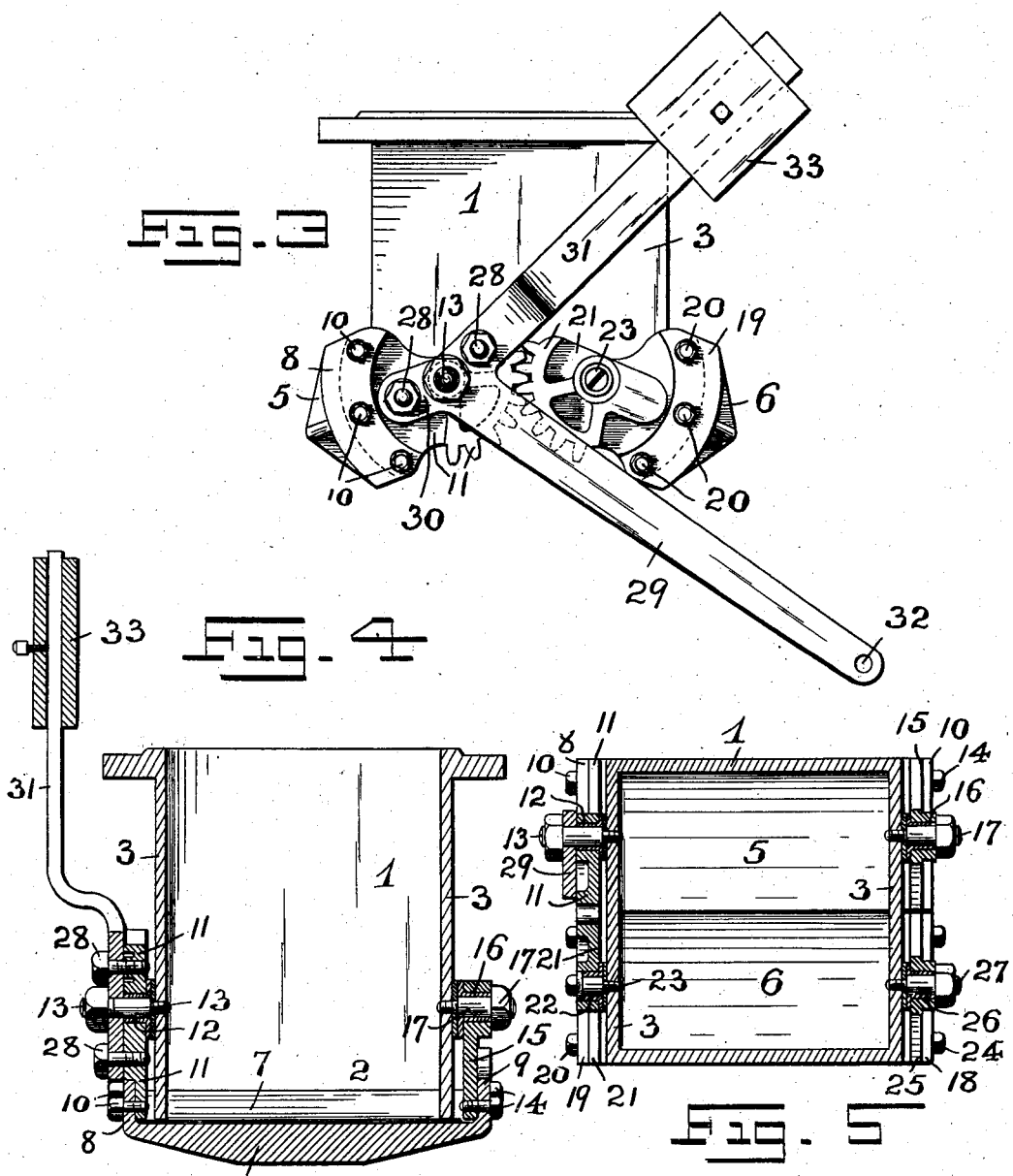

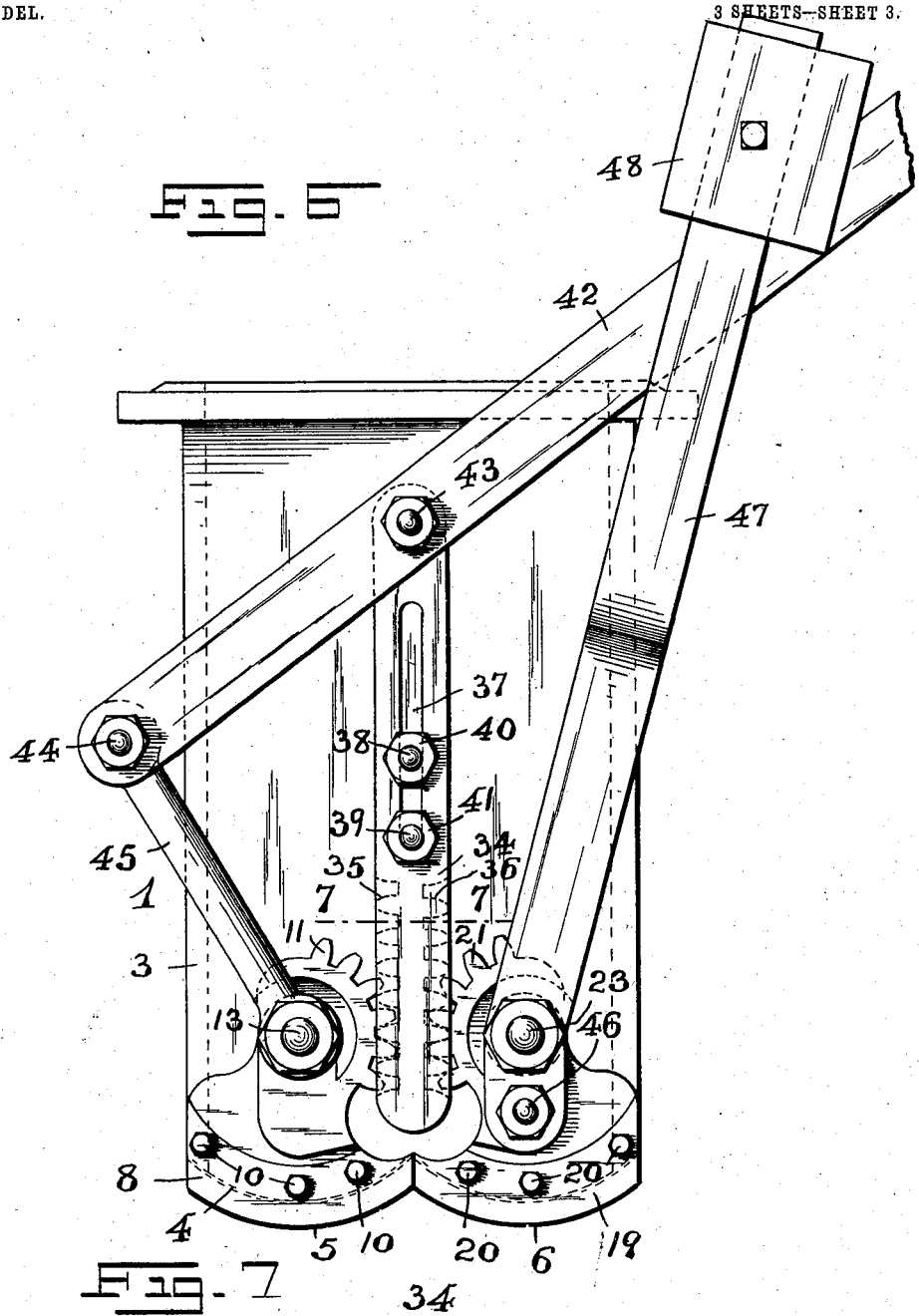

No. 737,200. Patented August 25, 1903.

UNITED STATES PATENT OFFICE.

FRANK BOWERS, OF LEBANON, PENNSYLVANIA, AND THOMAS REESE, JR., OF NEWARK, NEW JERSEY.

GATE-OPERATING MECHANISM FOR HOPPERS.

SPECIFICATION forming part of Letters Patent No. 737,200, dated August 25, 1903.

Application filed January 17, 1903. Serial No. 139,375. (No model.)

*To all whom it may concern:*

Be it known that we, FRANK BOWERS, residing at Lebanon, in the county of Lebanon and State of Pennsylvania, and THOMAS REESE, Jr., residing at Newark, in the county of Essex and State of New Jersey, both citizens of the United States, have invented certain new and useful Improvements in Gate-Operating Mechanism for Hoppers; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference generally to improvements in mechanism for operating the gate or gates connected with the delivery or discharge openings of hoppers, such as are used for delivering coal, grain, sand, dirt, and other materials; and the invention has for its primary object to provide a simply-constructed and easily-operated mechanism for opening and closing the gate or gates connected with hoppers of the class hereinabove stated.

A further object of the present invention is to so arrange a system of actuating levers or arms to be used with the gate-operating mechanism that there will be no possible lost motion and each part or member of the mechanism will act positively, and, furthermore, to provide, in connection with one of said levers or arms, a counterweight or balance which will positively retain the gate-operating mechanism in either its closing or opening relation to the gate or gates, thereby retaining the gate or gates in their fully-opened or completely-closed positions, as the case may be.

A still further object of the invention is to provide a mechanism of comparatively few parts, the same being of easy manipulation, so that the gate or gates can be opened or closed with a minimum exertion of power; furthermore, to so center the gate or gates in their suspended positions that they will not be forced open by the weight of the contents of the hopper and in closing will act with a cutting-off movement through the material being discharged, so that the latter will not become packed and prevent the closing of the gate or gates, the latter therefore closing in the mass of material with rapidity and ease.

Other objects of this invention not hereinabove more particularly specified will be clearly evident from the following description of our invention.

The invention therefore consists in the novel construction of gate-operating mechanism for hoppers; and, furthermore, this invention consists in the novel arrangements and combinations of the various parts, as well as in the details of the construction of the said parts, all of which will be hereinafter more fully described and then finally pointed out in the clauses of the claim.

The invention is clearly illustrated in the accompanying drawings, in which—

Figure 1 is a side view of a hopper and the gate-operating mechanism embodying the principles of the present invention, and Fig. 2 is a front view of the said parts. Fig. 3 is a side view of the hopper and the gate-operating mechanism, the parts of said mechanism being represented in their actuated positions when the gate or gates to the discharge or delivery opening of the hopper have been opened. Fig. 4 is a transverse vertical section taken on line 4 4 in said Fig. 1, a weight or counterbalance on one of the levers of the device, however, being also represented in section; and Fig. 5 is a horizontal section taken on line 5 5 in said Fig. 1. Fig. 6 is a side elevation of a hopper and a gate-operating mechanism of a modified form of construction, but still embodying the principles of this invention; and Fig. 7 is a cross-section, taken on line 7 7 in said Fig. 6, of a rack which is employed with the mechanism represented in said Fig. 6.

Similar characters of reference are employed in all of the said hereinabove-described views to indicate corresponding parts.

In the said drawings the reference character 1 indicates any usual form of hopper provided with a delivery or discharge opening 2. In the present construction of hopper the lower edges of its oppositely-placed sides 3 are made with a pair of curved marginal edges 4, as indicated in dotted outline in Figs. 1 and 6, the said opening 2 being closed by means of a pair of gates 5 and 6, which are curved, as at 7, (see Fig. 4,) so as to conform to the curvature of the lower marginal edges of the said sides 3 of the hopper.

The gate 5 is made at its opposite ends with upwardly-extending flanges 8 and 9. Connected with the flange 8 in any suitable manner, and preferably by means of bolts 10, is a toothed sector 11, which in turn is operatively arranged upon a brass or other suitable bushing 12 on a pin or pivot 13, extending from the one side of the hopper. In a like manner, connected with the other flange 9 of said gate 5, preferably by means of bolts 14, is a link or other suitable connection 15, which is operatively arranged upon a brass or other suitable bushing 16 on a pin or pivot 17, extending from the opposite side of the hopper 1. In this manner the gate is arranged in a perfectly centered and suspended position directly beneath the discharge-opening of the hopper. The other gate, 6, is made at its opposite ends with upwardly-extending flanges 18 and 19. Connected with the flange 19 in any suitable manner, but preferably by means of bolts 20, is a second toothed sector, 21, which is operatively arranged upon a brass or other suitable bushing 22 on a screw-headed pin or pivot 23, the teeth of said sector 21 being in operative mesh with the teeth of the sector 11, as clearly indicated in Figs. 1 and 3. Connected with the other flange, 18, of the said gate 6, preferably by means of bolts 24, is a link or other suitable connection 25, which is operatively arranged upon a brass or other suitable bushing 26 on a pin 27, extending from the side of the hopper. In this manner this gate 6 is also arranged in a perfectly centered and suspended position directly beneath the discharge-opening of the hopper, and both gates 5 and 6 are easily moved in opposite directions when the toothed sectors are oscillated by means of a system of levers or arms to be presently described.

Freely arranged upon a portion of the pin or pivot 13, but securely fastened to the sector 11 by means of studs or bolts 28 or in any other manner, is said system of levers or arms 29, 30, and 31, the lever or arm 29 being provided at or near its free end with a suitable means, such as a hole or opening 32, for the attachment to said lever 29 of a pull or other actuating device, as a rod or the like, by means of which the said lever can be moved from its normal position (indicated in Fig. 1) to its operated position (illustrated in Fig. 3) and back again from the position in said Fig. 3 to that represented in said Fig. 1. The arm or lever 31 is provided with a weight or counterbalance 33, which is preferably movably arranged upon said arm or lever, as illustrated.

From an inspection of Figs. 1 and 3 it will be clearly seen that when the arm or lever 29 is pulled over from its normally-raised position to its lowered position (indicated in said Fig. 3) the toothed section 11, being moved upon its pin or pivot 13, will also move the other toothed sector, 21, whereby the parts of the mechanism will assume the positions indicated in said Fig. 3, and the weight or counterbalance 33 on said arm or lever 31 being thrown beyond the vertical plane centrally between the two pins or pivots 13 and 23 the two gates 5 and 6 are positively retained in their opened positions, for the reason that when the lever or arm 29 has again been forced into its initial position (indicated in Fig. 1) the normal tendency of the balance or counter weight 33 upon the arm or lever 31 is in a downward direction (indicated by the arrow $x$) and to the left of the vertical plane, passing through the central axis of the pin or pivot 13, the two gates 5 and 6 will be retained in their positively-closed positions beneath the hopper. Furthermore, the arcs of the inner faces of the respective gates 5 and 6 having their centers respectively in the longitudinal axes of the pivots or pins 13 and 17 and the longitudinal axes of the pins or pivots 23 and 27 the two gates are perfectly hung and centered, and no matter how great the weight they have to carry while the hopper is closed said gates cannot be forced open by the weight of the contents, and while closing they will shut with a cut-off movement which prevents any packing or jamming of the contents of the hopper within the body of the same. The arrangement, therefore, of the gate-operating mechanism is such that the gates are readily and quickly opened and will close in the mass of the material while the same is being discharged from the hopper with ease.

In lieu of the form of gate-operating mechanism hereinabove described, and represented in Figs. 1 to 5, inclusive, a form of mechanism illustrated in Fig. 6 may be employed. In this construction the arrangement of the gates 5 and 6 and the toothed sectors 11 and 21 on the one side of the hopper and the link connections 15 and 25 upon the other side of the hopper are similar to the arrangement of these parts as set forth in connection with the mechanism represented in said Figs. 1 to 6, inclusive. As will be seen from an inspection of said Fig. 6, a rack 34, provided with oppositely-placed teeth 35 and 36, is arranged so as to slide between the two sectors 11 and 21, with the teeth 35 of said rack in engagement with the teeth of the sector 11 and the teeth 36 of said rack in engagement with the teeth of the sector 21. The said rack is provided with an elongated opening or slot 37, being slidably arranged upon a pair of pins or studs 38 and 39 and retained in its operative position upon said pins or studs by means of the nuts 40 and 41. Pivotally attached upon a bolt or pin 43, connected with the upper portion of said rack, is an operating arm or lever 42, which has at its lower end a pin or bolt 44. A connecting-link 45 is placed between said pin or bolt 44 and the pin or pivot 13 of the sector 11, as shown. Suitably secured against the side of the sector 21 by means of a bolt 46 is an arm or lever 47, upon the upper portion of which is a counter weight or balance 48.

The operation of the mechanism for opening and closing the gates of the hopper represented in said Fig. 6 is similar to that set forth hereinabove in connection with the construction represented in Figs. 1 to 5, inclusive, and will readily be understood from an inspection of said Fig. 6.

From the above description of our invention it will be seen that we have devised a simple and effectively-operating mechanism for the purposes of this invention and in which the gates are perfectly balanced when closed, so that they cannot be forced open by the weight of the material resting upon said gates, and when the gates move from their opened to their closed psitions they will close with ease and without packing or jamming the contents of the hopper during such closing movements of the gates.

We are fully aware that changes may be made in the various arrangements and combinations of parts, as well as in the details of the construction of the parts, without departing from the scope of our present invention. Hence we do not limit our invention to the exact arrangements and combinations of the parts as described in the foregoing specification and as illustrated in the accompanying drawings, nor do we confine ourselves to the exact details of the construction of any of the said parts.

Having thus described our invention, what we claim is—

1. In a hopper, a gate-operating mechanism, comprising, a pair of oscillating gates, means for pivotally attaching the said gates to the hopper, a pair of toothed sectors on one side of the hopper, and means for actuating said toothed sectors to thereby open or close said gates, consisting, essentially, of an actuating-lever attached to one of said sectors, and an arm and counterbalance connected with said actuating-lever, substantially as and for the purposes set forth.

2. The combination, with a hopper, of oppositely-arranged pivots extending from the sides of said hopper, a pair of oscillating gates for closing the delivery-mouth of said hopper, means for centering said gates upon the respective pivots, comprising a pair of toothed sectors upon the one side of the hopper and a pair of links upon the other side of the hopper, and means for actuating said toothed sectors, substantially as and for the purposes set forth.

3. The combination, with a hopper, of oppositely-arranged pivots extending from the sides of said hopper, a pair of oscillating gates for closing the delivery-mouth of said hopper, means for centering said gates upon the respective pivots, comprising, a pair of toothed sectors upon the one side of the hopper and a pair of links upon the other side of the hopper, and means for actuating said toothed sectors, consisting, essentially, of an actuating-lever attached to one of said sectors, and an arm and counterbalance connected with said actuating-lever, substantially as and for the purposes set forth.

4. The combination, with a hopper, of oppositely-arranged pivots extending from the sides of said hopper, a bushing upon each pivot, a pair of oscillating gates for closing the delivery-mouth of said hopper, means for centering said gates upon the respective bushings, comprising, a pair of toothed sectors upon the one side of the hopper and a pair of links upon the other side of the hopper, and means for actuating said toothed sectors, substantially as and for the purposes set forth.

5. The combination, with a hopper, of oppositely-arranged pivots extending from the sides of said hopper, a bushing upon each pivot, a pair of oscillating gates for closing the delivery-mouth of said hopper, means for centering said gates upon the respective bushings, comprising, a pair of toothed sectors upon the one side of the hopper and a pair of links upon the other side of the hopper, and means for actuating said toothed sectors, consisting, essentially, of an actuating-lever attached to one of said sectors, and an arm and counterbalance connected with said actuating-lever, substantially as and for the purposes set forth.

6. The combination, with a hopper, of oppositely-arranged pivots extending from the sides of said hopper, a pair of oscillating gates having upwardly-extending flanges at their ends, toothed sectors connected with the flanges at the one end and links connected with the flanges at the other end of each gate, said sectors and links being pivotally centered upon the respective pivots at the sides of the hopper, and means for actuating said toothed sectors, substantially as and for the purposes set forth.

7. The combination, with a hopper, of oppositely-arranged pivots extending from the sides of said hopper, a pair of oscillating gates having upwardly-extending flanges at their ends, toothed sectors connected with the flanges at the one end and links connected with the flanges at the other end of each gate, said sectors and links being pivotally centered upon the respective pivots at the sides of the hopper, and means for actuating said toothed sectors, consisting, essentially, of an actuating-lever attached to one of said sectors, and an arm and counterbalance connected with said actuating-lever, substantially as and for the purposes set forth.

8. The combination, with a hopper, of oppositely-arranged pivots extending from the sides of said hopper, a bushing upon each pivot, a pair of oscillating gates having upwardly-extending flanges at their ends, toothed sectors connected with the flanges at the one end and links connected with the flanges at the other end of each gate, said sectors and links being pivotally centered upon the bushings on the respective pivots at the sides of the hopper, and means for actuating said toothed sectors, substantially as and for the purposes set forth.

9. The combination, with a hopper, of oppositely-arranged pivots extending from the sides of said hopper, a bushing upon each pivot, a pair of oscillating gates having upwardly-extending flanges at their ends, toothed sectors connected with the flanges at the one end and links connected with the flanges at the other end of each gate, said sectors and links being pivotally centered upon the bushings on the respective pivots at the sides of the hopper, and means for actuating said toothed sectors, consisting, essentially, of an actuating-lever attached to one of said sectors, and an arm and counterbalance connected with said actuating-lever, substantialy as and for the purposes set forth.

In testimony that we claim the invention set forth above we have hereunto set our hands this 13th day of January, 1903.

FRANK BOWERS.
    THOMAS REESE, Jr.

Witnesses:
 FREDK. C. FRAENTZEL,
 GEO. D. RICHARDS.